United States Patent
Gurz

(10) Patent No.: US 7,996,317 B1
(45) Date of Patent: Aug. 9, 2011

(54) METHODS AND SYSTEMS FOR PROCESSING STRANDED PAYMENTS AND LOCKBOX PAYMENTS AT THE SAME DESIGNATED PAYMENT LOCATION

(75) Inventor: Cheryl Gurz, North Tonawanda, NY (US)

(73) Assignee: HSBC Bank USA, N.A., Buffalo, NY (US)

( * ) Notice: Subject to any disclaimer, the term of this patent is extended or adjusted under 35 U.S.C. 154(b) by 426 days.

(21) Appl. No.: 12/130,586

(22) Filed: May 30, 2008

Related U.S. Application Data

(60) Provisional application No. 60/996,512, filed on Nov. 21, 2007.

(51) Int. Cl.
*G06Q 40/00* (2006.01)

(52) U.S. Cl. .............. 705/45; 705/1; 705/26.1; 705/35; 705/38; 705/39; 705/40; 705/75; 235/462.02; 370/222; 382/101; 455/406

(58) Field of Classification Search ............. 705/1, 26.1, 705/35, 38, 39, 40, 75; 235/462.02; 370/222; 382/101; 455/406
See application file for complete search history.

(56) References Cited

U.S. PATENT DOCUMENTS

| | | | | |
|---|---|---|---|---|
| 3,845,472 | A * | 10/1974 | Buchanan et al. | 370/222 |
| 7,640,190 | B1 * | 12/2009 | Sullivan et al. | 705/26 |
| 7,664,689 | B1 * | 2/2010 | Rosenfield et al. | 705/35 |
| 2002/0063157 | A1 * | 5/2002 | Hara | 235/462.02 |
| 2002/0138426 | A1 * | 9/2002 | Craddick | 705/40 |
| 2003/0069838 | A1 * | 4/2003 | Harland | 705/38 |
| 2003/0233321 | A1 * | 12/2003 | Scolini et al. | 705/40 |
| 2004/0181493 | A1 * | 9/2004 | Cross et al. | 705/75 |
| 2004/0203585 | A1 * | 10/2004 | Wills et al. | 455/406 |
| 2006/0143123 | A1 * | 6/2006 | Rallo et al. | 705/40 |
| 2007/0038561 | A1 * | 2/2007 | Vancini et al. | 705/39 |
| 2007/0110277 | A1 * | 5/2007 | Hayduchok et al. | 382/101 |
| 2007/0265862 | A1 * | 11/2007 | Freund et al. | 705/1 |
| 2008/0040249 | A1 * | 2/2008 | Re et al. | 705/35 |

OTHER PUBLICATIONS

"Clearing House Interbank Payments System" definition from investorwords.com, 1 page, printed on Mar. 23, 2011.*

* cited by examiner

*Primary Examiner* — James P Trammell
*Assistant Examiner* — Sanjeev Malhotra
(74) *Attorney, Agent, or Firm* — Stroock & Stroock & Lavan LLP

(57) ABSTRACT

Embodiments of the invention describe an electronic method for processing stranded payments and lockbox payments at the same designated payment location. The method includes receiving a stranded payment at a non-designated payment location, and electronically scanning the stranded payment at the non-designated payment location. The scanned information is transmitted, in a secure manner, to a designated payment location remote from the non-designated payment location. The stranded payment and a lockbox payment are cleared, in the same electronic workflow, the transmitted information is used in the clearing process. Embodiments of the invention also include updating, for each stranded and lockbox payment, the accounts receivable system of the customer receiving the stranded or lockbox payment, and transmitting a response indicating the final status of the clearing of the stranded payment to the non-designated payment location.

28 Claims, 14 Drawing Sheets

|  | 302 | 304 | 306 |
| --- | --- | --- | --- |
|  | FIELD | DATA TYPE | COMMENTS |
|  | RUN LEVEL: | | |
| 308 | Work Source | Numeric (10) | Identifies the TMS sort pattern to use for each specific client. This is a 10-digit number. The field will be pre-filled with zeroes as required. The value will be available through configuration in Xpedite, and must be carried through from Xpedite to Xchange. |
|  | | | |
|  | | | |
|  | BATCH LEVEL | | |
| 310 | Batch Number | Numeric (04) | In conjunction with the Device Id and the branch date, this uniquely identifies the batch. The value for this (4-digit number) will be set by Xpedite and carried through to Xchange. |
| 312 | Branch Date | Numeric (08) | Format yyyymmdd. Business date value set in Xpedite. |
| 314 | Work Type/Batch Mode | Numeric (02) | Identifies the type of remittance work (singles, etc). The code values are:<br>01 = multiples, 03 = Checks Only, 04 = Singles. |
| 316 | Total Items | Numeric (03) | Number of items in the batch. Max 999. The limit of 999 will be managed via Xpedite configuration. |

Figure 3A

| FIELD | DATA TYPE | COMMENTS |
|---|---|---|
| ITEM LEVEL | | |
| Seq No. (Doc Id) | Numeric (10) | This is the ISN (DIN) of the item. The value will be assigned in Xpedite and carried through to Xchange. Xpedite will be configured for a DIN in<br><br>This is a single 10 digit unique number |
| Image Seq No. (Image Doc Id.) | Numeric (09) | This is the key for the item into the image file. |
| Item Type (Gender) | Alpha (02) | CR/DB |
| Raw Stub Line | AlphaNum (96) | OCR scanline as returned by the device scanner, with all special characters including spaces and dashes (no compression). |
| Raw MICR Scan Line | AlphaNum (96) | "MICR scanline as returned by the device scanner, with all special characters including spaces and dashes (no compression)."The MICR symbols returned by the device will be translated to alternate characters (to be documented). Max 96 characters. |
| Stub Account Number | AlphaNum (20) | The value for this will be entered (by the user at the client site) in a custom field. Max 20 characters. |
| Check Type | Numeric (01) | Identifies Travelers check items. Values are: 0 = Not a Travelers check. 1 = Travelers check. |
| AuxOnus | AlphaNum (10) | Value of the AUX field as stored in Sierra Xchange. May contain 'cant read characters'. Optional field |
| RT No | AlphaNum (09) | Value of the RT field as stored in Sierra Xchange. RT is expected to be corrected at the client site, so this should not contain 'cant read characters'. ABA routing and transit number. |
| TranCode | AlphaNum (06) | Value of the TranCode field as stored in Sierra Xchange. May contain 'cant read characters'. Specifies the type of transaction (e.g. credit or debit) |
| Check Account Number | AlphaNum (20) | Value of the Account Number field as stored in Sierra Xchange. May contain 'cant read characters'. |
| Amount | AlphaNum (10) | Value of the Amount field as stored in Sierra Xchange. May contain 'cant read characters'. A decimal point will not be stored in this field. |
| IQUA Result | Numeric (01) | Constant of 1. Always assumed Pass |
| PO Box /Account Number | Numeric(12) | PO Box or account number that the user selected as described in requirement 1.3.6 |

Figure 3B

| DATA FIELD | XML FIELD NAME | COMMENTS |
|---|---|---|
| RUN LEVEL: | | |
| Work Source | Field1 | The Financial Institution Name field in Sierra Config \| Front Counter screen will be used to define this value. |
| | | |
| | | |
| BATCH LEVEL | | |
| Batch Number | BatchNbr | |
| Branch Date | BranchBusinessDate | Format: YYYMMDD |
| Work Type/Batch Mode | Field4 | |
| Total Items | Field8 | Computed within the report. |

Figure 4A

| FIELD | DATA TYPE | COMMENTS |
|---|---|---|
| ITEM LEVEL | | |
| Seq No. (Doc Id) | ISN | |
| Image Seq No. (Image Doc Id.) | ImageDocID | |
| Item Type (Gender) | Gender | CR=Credit, DR=Debit. Stubs are treated as Credits and Checks are treated as debits. |
| Raw Stub Line | Field3 | |
| Raw MICR Scan Line | Field3 | |
| Stub Account Number | Field2 | Valid only for checks in the ChecksOnly transaction type. This field will contain 0's in other cases. |
| Check Type | Field6 | |
| AuxOnus | Aux | |
| RT No | RT | |
| TranCode | TC | |
| Check Account Number | AN | |
| Amount | Amount | |
| IQUA Result | Field7 | Constant of 1. Always assumed Pass |
| PO Box /Account Number | Field5 | |

Figure 4B

METHODS AND SYSTEMS FOR PROCESSING STRANDED PAYMENTS AND LOCKBOX PAYMENTS AT THE SAME DESIGNATED PAYMENT LOCATION

CROSS-REFERENCE TO RELATED APPLICATIONS

This application claims the benefit under 35 U.S.C. 119(e) of U.S. Provisional Patent Application No. 60/996,512 filed on Nov. 21, 2007 entitled "Methods and Systems for Remote Payment Capture through Customer Operated Processing Terminals", which is hereby incorporated by reference herein in its entirety.

BACKGROUND OF THE INVENTION

1. Field of the Invention

The invention relates generally to check and remittance payment processing. More specifically, the invention relates to processing both stranded payments and lockbox payments at the same designated payment location. Stranded check and remittance payments are remotely captured, and then processed together with lockbox payments at the designated payment location, and using the same overall process flow.

2. Description of the Related Art

A critical function of any business is receiving payments for goods and services. One way businesses accomplish this function is through the services of lockbox processors (e.g. retail lockbox processor), who receive payments for a business (a lockbox service customer), for example, at a postal box. These payments are processed, and then deposited into the customer's account. Detailed information about the payments can be provided to the customer for their accounting systems.

One type of payment is a check which people have written to pay a bill, or pay for an item. Another type of payment is a remittance that contains the appropriate payment information, for example a utility bill with credit, debit, or other payment.

In some cases, businesses receive "stranded" payments that were not sent to the designated location, such as, the retail lockbox processor. These are a category of payment processing transactions that include: misdirected lockbox payments mailed directly to the business's (biller's) corporate or service centers, walk-in payments, and field-office received payments.

These "stranded payments" can be handled in two ways. First, they may be handled by the business's staff, and then deposited locally. Second, they can be forwarded by mail packages to a lockbox processor. In the first scenario, the lockbox processor looses revenues and deposits, while the customer has increased costs for processing the items and maintaining local depository relationships. In the second scenario, the customer has increased costs related to preparing and sending the packages and the lockbox processor has higher operating costs as these packages are handled in an exception manner outside the normal workflow for processing payments.

Retail lockbox is a mature product that is offered in a competitive marketplace. With the capital investments required for the adaptation of image technology and the decrease in consumer check payments, many lockbox processors have exited the field, leaving a small number of national retail lockbox providers and various regional lockbox providers. What is needed is a way of better processing "stranded" payments to save time and costs, and well as compete more effectively in the retail lockbox marketplace. Further, by increasing volume, additional fees can be generated and cost structures can be lowered.

SUMMARY OF THE INVENTION

Embodiments of the invention describe an electronic method for processing stranded payments and lockbox payments at the same designated location. The method includes receiving a stranded payment at a non-designated payment location, and electronically scanning the stranded payment at the non-designated payment location. Scanning the stranded payment includes generating a digital image of the stranded payment, performing optical character recognition on the digital image of the stranded payment, and recognizing data on the stranded payment by application of a predetermined template defined in accordance with the format of the stranded payment, validating the digital image of the stranded payment and the recognized data. The method further includes transmitting, in a secure manner, the digital image of the stranded payment and the recognized data to a designated payment location remote from the non-designated payment location. The method further includes clearing, in the same electronic workflow, the stranded payment and a lockbox payment sent directly to the designated payment location, wherein the recognized data is used in clearing the stranded payment, and storing the recognized data, the digital image of the stranded payment, and a digital image of the lockbox payment in a database. The method further includes updating, for each stranded and lockbox payment, the accounts receivable system of the customer receiving the stranded or lockbox payment; and transmitting a response indicating the final status of the clearing of the stranded payment to the non-designated payment location from which the digital image of the stranded payment and the recognized data were received from.

In certain embodiments of the invention the stranded payments are remittance payments. In other embodiments, the database is accessible by at least one of customer service representative, payees, and customers.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 3A is a description of the remote payment information data exchange format.

FIG. 3B is further description of the remote payment information data exchange format.

FIG. 4A is a description of the remote payment information XML data exchange format.

FIG. 4B is a further description of the remote payment information XML data exchange format.

DETAILED DESCRIPTION OF EMBODIMENTS OF THE INVENTION

Figure 1:
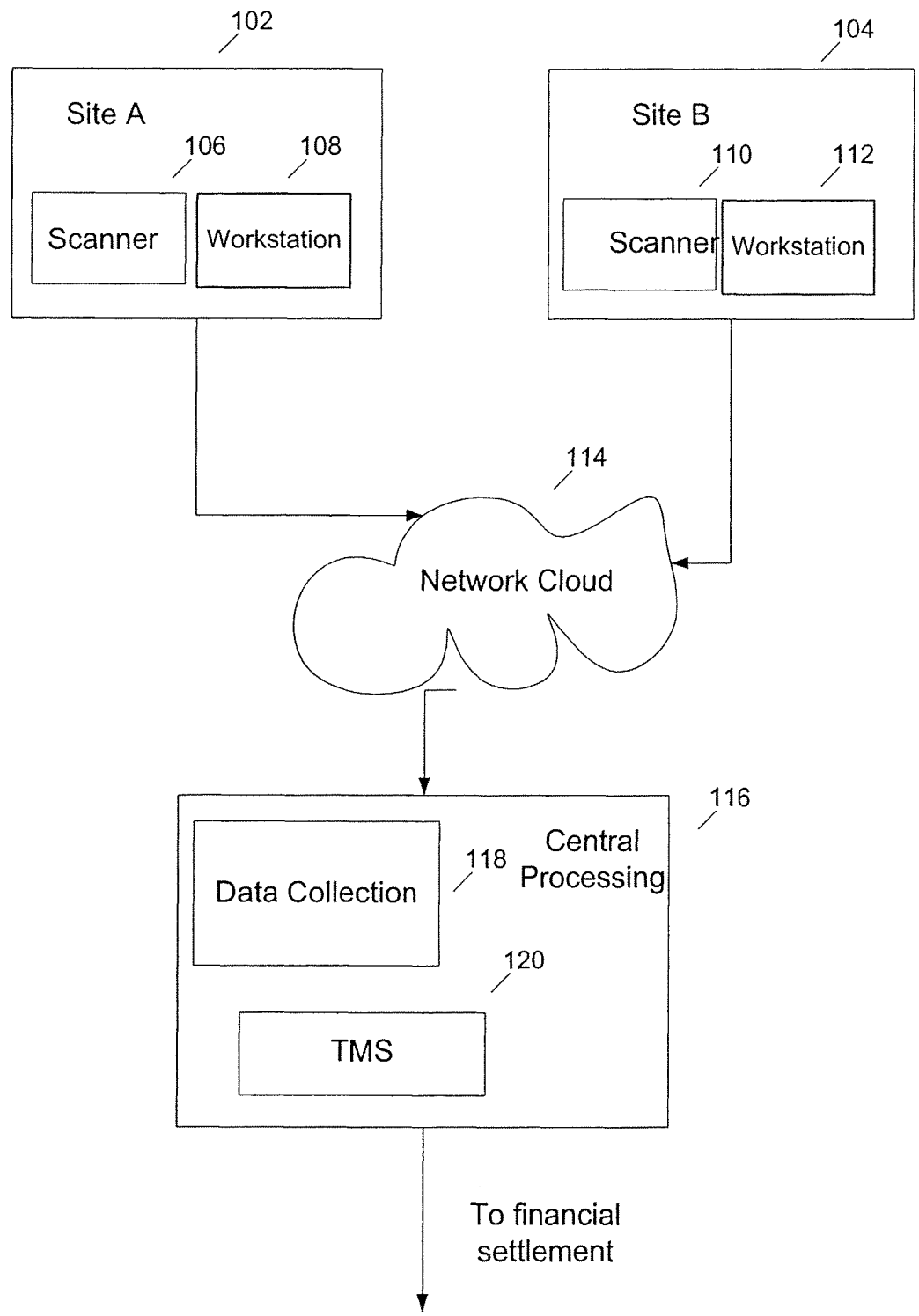
FIG. 1 is a system diagram showing the overall architecture of the remote payment processing system.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the invention process both stranded payments and lockbox payments at the same designated payment location using the same process flow. Stranded check and remittance payments are remotely captured, and sent to the designated lockbox payment location to be processed along with standard lockbox payments using the same business rules and methods.

The remote capture and processing of stranded payments takes advantage of the flexibility provided by Check 21, a federal law relating to check processing, to more efficiently process stranded payments. The remote capture of stranded payments streamlines the collecting and processing of consumer payments for business clients, and provides accelerated receivable collection and efficient accounts receivable system updates. The benefits from this more efficient process include reduced costs for overnight lockbox package charges, faster access to funds, fewer bank relationships, expedited postings for their customers, and a centralized repository for images related to customer payments.

Embodiments of the invention include remotely capturing stranded payments not sent correctly to a lockbox processor. The stranded payments are scanned at the remote location where they were received. Both check and remittance payments can be scanned and processed. A scanning device, either alone or with a computer system, can scan the check and remittance payments. Data is scanned from checks and remittances using known optical character recognition (OCR) technology, and post processing software. The correct data is retrieved by use of predetermined templates that identify the location and type of information on the checks and remittances. The data captured from the scanning process is then formatted, validated, and electronically transmitted to a central process location where the data can be further processed and merged into the standard lockbox workflow. This includes following all business rules defined by the customer and maintained in the core lockbox application. (i.e. ARC, BOC, image archive, exception processing, etc). The standard lockbox workflow processes the payments, both remote and regular lockbox payments. This includes storing them for later retrieval, coordinating data exchange with other entities, and posting payments to customers' accounts.

FIG. 1 shows a system diagram of the overall architecture of the remote payment processing system. The system includes multiple remote sites 102 and 104, each with a scanner 106 and 110, and workstation 108 and 110. The multiple remote sites are connected through a network 114 to a central processing location 116. The central processing location 116 includes data collection component 118, and transaction management system 120. Through central processing location 116, financial settlement is performed and payments are posted to customers' accounts.

Remote sites 102 and 104 are remote sites where stranded payments have been received. These can be one of many locations that were not the designated lockbox location, such as, a bank branch, a customer service center, or a corporate office. There may be any number of remote sites. Further, the customer may already be using standard lockbox payment processing services from the stranded payment processor. This allows all of a customer's payments to be handled by the same payment processor, simplifying the customer's business processes.

Each remote site 102 (or 104) includes a scanner 106, along with a workstation 108. The functions of the workstation can be integrated into the scanning device depending on the implementation of the system. The scanner 106 can be a commercially available scanner, for example, a Panini scanner from Unisys. The scanner has the ability to scan single or multiple checks or remittances at once, and to provide the scanned digital image data to workstation 106.

Workstation 106 (or 112) is a standard computer workstation capable of running scanning software that presents a user interface to the scanner user, and that has software for controlling the scanning process. This software, as described further below, includes features for selecting the type of payment being processed, options for batch processing, the ability to review scanned data and images for accuracy, the ability to enter additional data, the ability to correct scanned data, and the ability to transmit the scanned data to a central lockbox location. The software on workstation is also responsible for formatting scanned information.

Data can be transmitted through network 114 using any number of well known communication protocols such as TCP/IP and higher level protocols such as FTP and HTTP. Further, encryption can be used to ensure that the financial data is not intercepted during transmission. The data itself can be encrypted, or secure transmission protocols like secure FTP (SFTP) and Secure Sockets Layer (SSL) can be used.

Central processing location 116 can be a lockbox location where regular lockbox payments are received. It includes data collection system 118 and transaction management system (TMS) 120. Data collection system 118 includes software for receiving data transmitted from remote sites 102 and 104 and workstations 108 and 112. It includes software for validating the received data and integrating it with the standard lockbox payments. TMS system 120 uses the data provided by data collection system 118 and processes the transactions by communicating with other entities and components to properly process payments from payers' accounts, and to credit customers' accounts.

Figure 2:
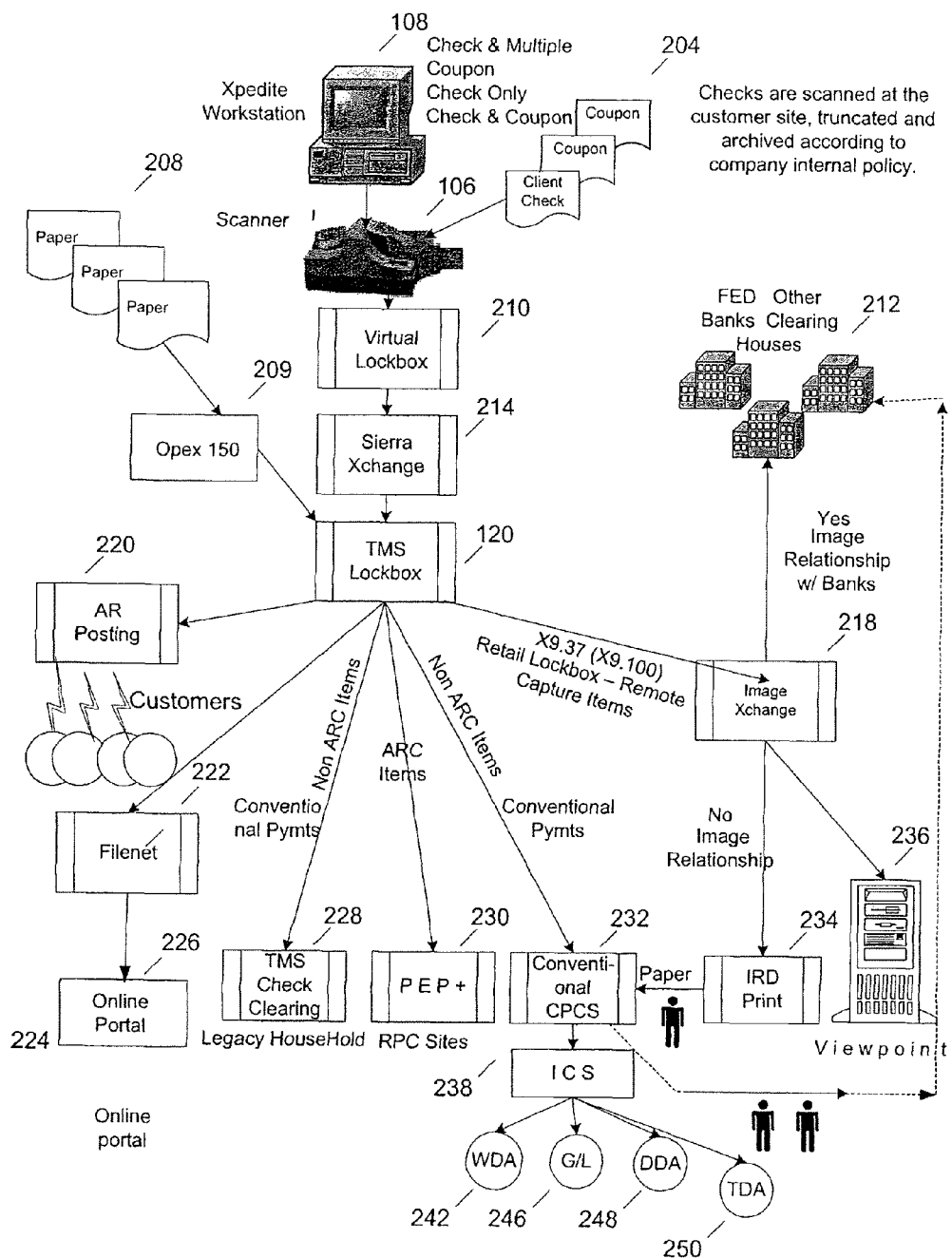
FIG. 2 is a system diagram showing the design and processes involved in the remote payment processing system.

FIG. 2 shows the design and processes involved in the remote payment processing system. The system includes workstation 108, scanner 106, and virtual lockbox software 210 in communication with Sierra Xchange software 214, which feeds data into transaction management system (TMS) 120. TMS 120 also receives paper payments 208 which are processing by Opex 150 scanners 209 before being combined into the lockbox workflow. TMS 120 is connected to Image Xchange network 218, accounts receivable posting 220 (connected to customers 224), filenet data storage and retrieval system 222 (connected to online portal 226), check clearing for legacy system 228, ACH transaction system 230, and conventional check clearing 232. Conventional check clearing system 232 is further connected to internal control system (ICS) 238, wholesale deposit accounts (WDA) 242, general ledger 246, demand deposit accounts 248, and savings accounts (TDA) 250. Conventional check clearing system is also further connected to other financial processing entities 212, and indirectly to image replacement document (IRD) print system 234, Image Xchange network 218, and viewpoint 236.

Workstation 108 runs virtual lockbox software 210 for interacting with a user using scanner 106 to scan in stranded payments (either checks or remittances). The software can be designed using standard technologies for applications and graphical user interface development. By using optical character recognition technology, scanned images of the payments can be analyzed and the appropriate data extracted for processing.

In additional to checks and remittances, the system can also process gift certificates. These gift certificates can have a scanline and MICR information like checks for easier processing. Alternatively, information can be entered manually.

The optical character recognition technology works in conjunction with programmed templates to recognize the location of data from the scanned images of remittances. These templates are based on the expected format of the remittances. Using templates speeds up the scanning process by identifying for the OCR software where relevant information is located on the scanned image of the remittance. Remittances formats are designed by the customer, and therefore the templates account for variations in formats between customers. Templates can also be used when scanning checks.

Data from the scanning of payments is sent to Sierra Xchange 214, for example, through the internet. Sierra Xchange is middleware that acts as a traffic cop preprocessing data for the TMS 120. It provides an interface to the TMS 120 which is responsible for processing lockbox payments (e.g. retail lockbox payments) and work to direct the images captured on the remote scanner to TMS for their inclusion in the TMS workflow. It is located at the collection site, and is used to collect the information scanned from remote sites. The interface is based on an XML format file. The XML interface is an input method for TMS and allows TMS to identify the input method.

Once the scanned information has been received by the Sierra Xchange processor, generally in a batch from a batch of scanned payments, an "all items" XML extract in created. This XML file, as further detailed in FIGS. 3 and 4, provides an interface to TMS 120. Other interfaces can also be used depending on the particular collection software and transaction management software being used. In this way remotely scanned payments can be integrated into the same transaction processing workflow as lockbox payments, for example, those payments sent to the designated lockbox location and scanned with Opex 150s 209.

TMS 120 is commercially available software that executes transactions based on received data, for example, from J & B software. TMS 120 is connected to various other components of the payments processing system to execute transactions. TMS 120 can also receive regular paper payments 208 that were correctly sent to the lockbox location. These are first processed by high speed Opex 150 scanners to integrate the payments into the electronic workflow.

Accounts receivable 220 is a system that is connected to customers' 224 accounting systems. Through this connection, payments that are received can be posted to customers' accounts receivables systems, allowing them to know which payments have, or have not, been received.

Filenet 222 is a storage system that can be built using known technologies and is used to store payment data. This can include storing both the data extracted from the scanned images, and the scanned images themselves. The filenet system 222 is shown connected to online portal 226. Online portal is a web based portal that can be used by customers, lockbox service providers, customer support representatives, or payers who wish to review their payment information. Filenet provides a single location for storage of scanned images, includes those from remote sites, as well as regular lockbox payments. Previously, stranded payments might have been processed through any number of other workflows, preventing centralized storage.

PEP+ is the name for the automated clearinghouse transaction system 230. This system is responsible for preparing transactions that are to be processed using the ACH system.

Conventional CPCS 232 is a check clearing system used to clear check payments. The TMS check clearing system 228 represents one type of legacy check clearing system with the same functionality.

The Image Xchange network 218 is connected to TMS 120 and is used to exchange check images with other banks and clearing houses 212. In this way, check processing can be done without the need to transfer large numbers of printed checks between banks. Through the Image Xchange network 218, the clearing of checks can be done electronically. In the event that a bank does not participate in the Image Xchange network, viewpoint system 236 can be used to print a substitute check that can be transferred to another bank. This minimizes the number of printed checks that need to be transferred. IRD printing 234 can also be used as a backup for any problems with the Image Xchange network, or any particular payment.

To facilitate the clearing of checks and the updating of accounts, Conventional CPCS check clearing system 232 is connected to internal control system (ICS) 238. This system handles communication between the check clearing system and demand deposit accounts 248 and savings accounts 250 of customers. ICS 238 also handles manages clearing checks from wholesale customers 242. As checks are being cleared, the processing bank's general ledger 24 is updated.

FIG. 3A is a description of the remote payment information data exchange format. This data exchange format describes how the data that is extracted from the payments is formatted and prepared for further processing done by the Sierra Xchange system 214. The data is hierarchically defined into run level, batch levels, and item levels. The run level describes the overall data package. Each package can contain multiple batches of scanned payments. The item level describes a single scanned payment and the data extracted from the scanning process.

The table has a column for the field name 302, the data type 304, and a description of the item 306. The work source 308 identifies the client proving the data; this is useful because the Sierra Xchange and TMS 120 may process payment data from multiple locations and multiple customers in no particular order.

The batch level includes: a batch number field 310 uniquely identifying the batch of payment data being provided, a branch date field 312 describing the date the batch of data was extracted, a worktype/match mode field 314 describing the type of work (e.g. a single check, single remittance, multiple checks, or multiple remittances), and a total items field 316 describing the total number of items in the batch 316.

FIG. 3B is further description of the remote payment information data exchange format. The item level includes: a sequence number 318 providing an identification number for the item, an image sequence number used as a key for retrieving the scanned image, an item type 322 identifying the type of item, a raw stub line 324 containing the scanline returned from the OCR system, a raw MICR scanline 326 containing the MICR scanline returned from the OCR system, a stub account number 328 entered by the user at the client site, a check type 330 identifying whether a item is a travelers check or not, an optional AuxOnus field 332 storing information about the payment, a RT No field 334 storing ABA routing and transit information, a TranCode 336 field storing whether the transaction is credit or debit, a Check account number field 338, an amount field 340, an IQUA field identifying whether the image quality is sufficient (normally only quality images will be sent for later processing), and a PO Box field/Account number field 344 that a user selected when using the scanning system.

FIG. 4A is a description of the remote payment information XML data exchange format that corresponds to the data fields described with respect to FIGS. 3A and 3B. Similar to FIGS. 3A and 3B, the XML format is hierarchical and broken into a run level, batch level, and item level. The table describes the data field 402, the XML field name 404, and a brief description 406. The run level includes a work source field (Field1) 408 describing the customer. The batch level includes a batch number field (BatchNbr) 410, a branch date field (BranchBusinessDate) 412, a work type/batch mode (Field4) 414, and a total items field (Field8) 416.

FIG. 4B is a further description of the remote payment information XML data exchange format that corresponds to the data fields described with respect to FIGS. 3A and 3B. The item level includes: a sequence number field (ISN) 418, a image sequence number field (ImageDocID) 420, an item type field (Gender) 422, a raw stub line field (Field3) 424, a raw MICR scan line field (Field4) 426, a stub account number field (Field2) 428 a check type field (Field6) 430, an AuxOnus field (Aux) 432, a RT No field (RT) 434, a TranCode field (TC) 436, a check account number field (AN) 438, an amount number field (Amount) 440, an IQUA result field (Field7) 442, and a PO box/account number field (Field5) 444.

Figure 5A:
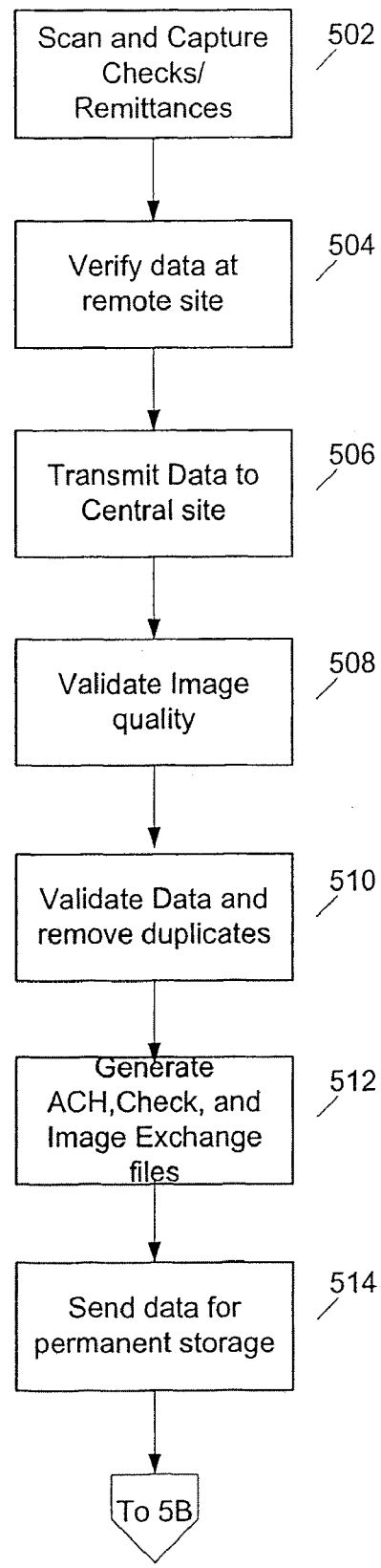
FIG. 5A is a flow diagram of the first part of the overall remote payment capture process.

FIG. 5A is a flow diagram of the first part of the overall remote payment capture process. It describes how data is scanned, verified, and then further processed for clearing through either ACH, checks, or the image Xchange network.

At step 502, a user uses the scanning system to scan checks and/or remittances (See FIGS. 7-11). The customer will process these payments using the scanning device, for example, in batches. A group of items will be placed in the feeder and each document will be scanned using the scanning device and computer workstation. The scanner application will capture an image of each check and remittance. In addition, the system will identify a document as a check, perform image quality analysis to validate check usability, validate routing and transit numbers, perform legal amount recognition (LAR), character amount recognition (CAR), and intelligent character recognition (ICR) for data capture.

The image quality analysis can be configured for, a partial image test for flawed edges and missing/folded corner, an excessive skew test, and a too light or too dark test. Upon failure of an image quality test, the user will be notified through an error message and be given the chance to correct the error and rescan the item.

When a document is identified as a remittance, the system will lift any optical character (OCR) data identified for population into the data file output. In situations where a remittance is not received, the customer has the ability to data entry custom fields, which can include account numbers. The application is configured such that the customer is not required to balance the work.

Once the images and data are confirmed by the customer, the application will prepare an image file and an all items data file for transmission via FTPS, by the desktop application, to the core lockbox system for subsequent processing. The raw scanline data will be returned from the device without any compression in an XML format. Along with each XML file, a set of image files in CAPI format with the same name as the XML file will be created and transmitted. Reports which include images and data of captured transactions will be generated on the customer workstation. Customers have the option to forward images and data to multiple lockbox accounts.

After the scanning process is complete and the data has been transmitted, at step 504 the data is validated by the remote system to confirm that it can be properly processed. This validation includes checking ABA transit and routing numbers, checking the payment amount, and checking image quality. At step 506, once the data has been scanned and validated it is transmitted to the central TMS 120 for further processing and completion of the payment transaction. When the data is received at the central lockbox location, it is combined with other lockbox payments and provided to the transaction management system. The transaction management system (TMS) checks the incoming data to make sure it is valid, and begins the process for posting the payments to the business customer's account, and clearing the consumer's payments. At step 508, the image quality is validated to ensure that is meets legal requirements and is useful.

At step 510, any duplicate data, for example, a check that was scanned twice, is removed. TMS will collect the data and images as generated from the payments. TMS then validates all Scanline Data/Edits/CAR/ICR along with any amount edits/Mis-Encode edits, similar to the batches captured at the remote sites. At the end of the processing, TMS provides a Reject Reconciliation report to be used for operations balancing. Business rules are also applied at this step, they define what to do for payments that are too large or too small, or missing account numbers or other information.

At step 512, the proper type of clearing transaction is started depending on the type of payment and the payer. To update payee's accounts, TMS will generate ACH (NACHA), Check, Payment, and Image Exchange files. These files can be sent to the appropriate entities over the corresponding electronic network. For example, ACH transactions can be processed through the Federal Reserve System. Image Xchange files can be used with other banks to clear the payee's checks payments.

At step 514, all the received data is stored in the filenet system 222 so that it can be made available to customers, customer service representatives, or payees, through an online portal or other system.

Figure 5B:
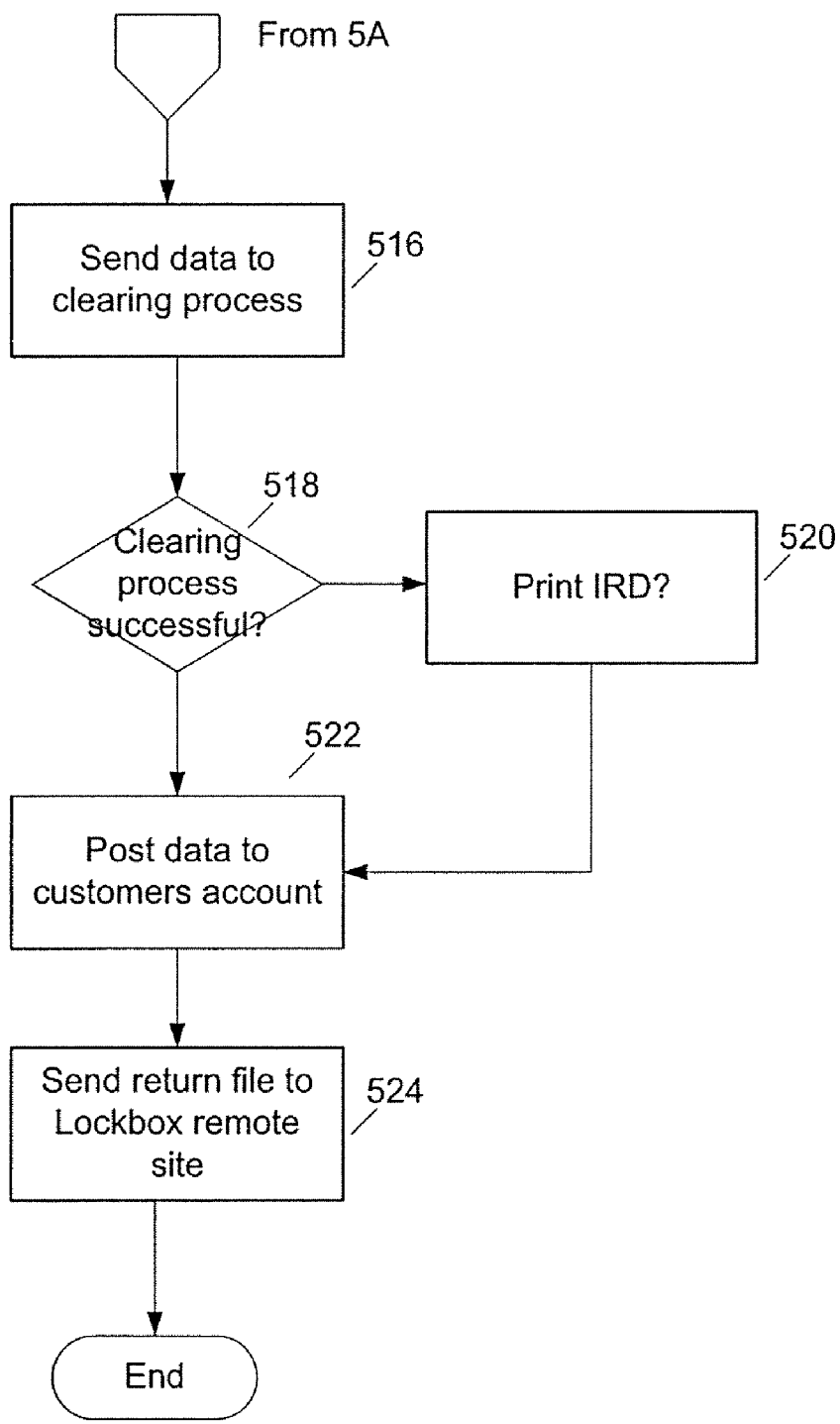
FIG. 5B is a flow diagram of the second part of the overall remote payment capture process.

FIG. 5B is a flow diagram of the second part of the overall remote payment capture process. This describes the process for clearing a payment.

At step 516, the payment data is sent to the proper clearing network depending on the payee and type of payment. This can be either standard check clearing, an ACH network, or the image Xchange network for electronically exchanging checks with other financial entities. At step 518, it is determined if the clearing process was successful, if not, an image replacement document (IRD) can be printed at step 520 and used instead of an electronic image (e.g. there was an error). An image replacement document can also be used if the other financial entity is not part of the image Xchange network. Data can be posted to a customer's account at step 522. At step 524, a return file is sent to the remote lockbox site as confirmation of which payments were cleared.

Figure 6:
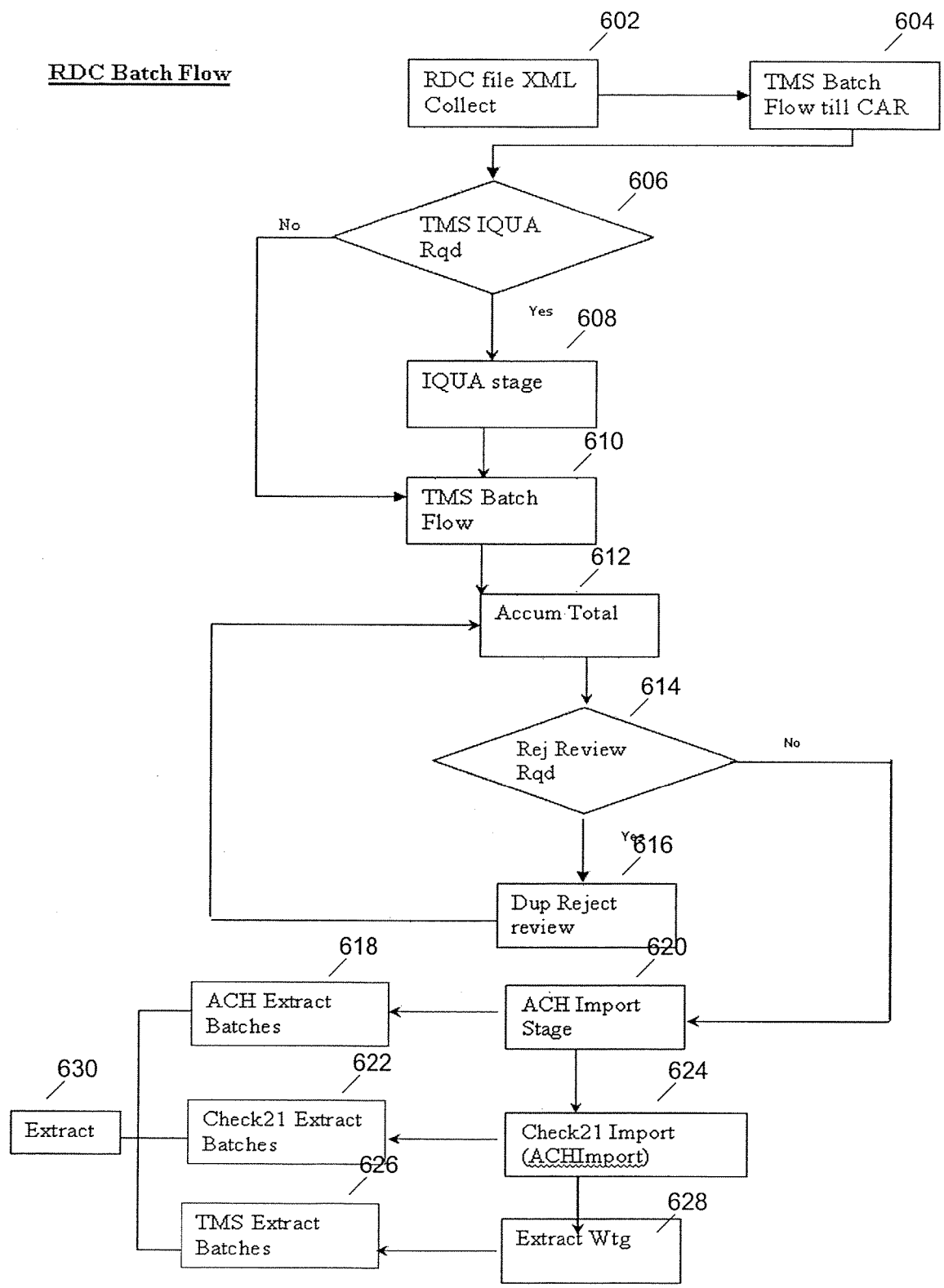
FIG. 6 is a flow diagram showing details of processing remotely captured payments.

FIG. 6 is a flow diagram showing details of processing remotely captured payments at the central designated payment processing location. This process details how incoming scanned data is validated and prepared to be sent to the clearing networks. After collecting the data, it is sent through image quality analysis, duplicate review, and a batch processing stage.

At step 602, the remote deposit data is collected, and character amount recognition is performed. At step 606, it is determined if image quality analysis needs to be performed, if so this is done at step 608, otherwise the TMS batch flow begins at step 610.

At step 610, the payment data is processed in batches. The accumulated total 612 represents the total dollar amount of the checks received and number of transactions.

Transactions that are not matched during the first pass image capture are sent to data entry for subsequent processing. The data entry functions include amount entry, scan line repair, MICR line repair, and check only entry and balancing. During data entry, depending on customer specifications, value added services such as name and address capture, direct debit capture, and credit card processing can also be performed.

At step 614, it is determined if a duplicate rejection review is required. If so, then at step 614 this is performed, otherwise the transaction processing continues to step 620. Analysis for duplicate payments can occur over a period of days, for example, 5 business days. This can be done using a database storing check images, including one just for duplicates. This duplicate detection helps payees by not processing two payments for the same bill. At step 620, data is imported for clearing through the ACH network. This can be either through the Check21 Import 624, or directly through ACH extract batches 618. If the transactions are to be executed according to Check21, then Check21 extract batches are created.

Finally, at step 628 extract processing is done. The extracts are checks that are not eligible for ACH or image exchange processing. These checks can be cleared in a paper environment or handled as exceptions and corrected to make them eligible for ACH or image clearing.

At step 630, extraction is done. At this step, the system performs an input/output control function to verify all transactions have been processed. The transactions are then approved for all post application processing, such as clearing.

Figure 7:
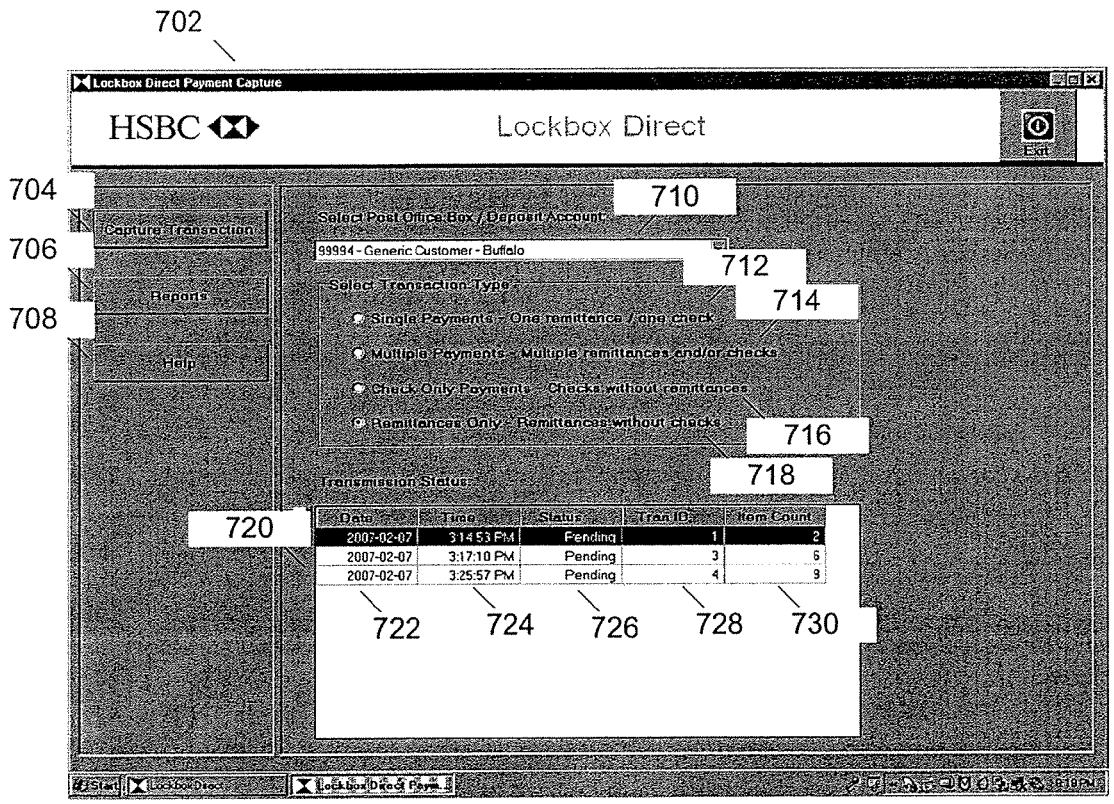
FIG. 7 is a graphical interface for capturing payments within a software application used during the remote payment capture process.

FIG. 7 is a graphical user interface for capturing payments within a software application used during the remote payment capture process. The graphical user interface is executed on the workstation connected to the scanner (or may be integrated with the scanning system) and includes buttons for control of the scanning system 704-708, an input area to select options related to scanning operation 712-718, and an output 720 area showing information about the payments that have already been scanned.

Drop down field 710 allows a user to select the demand deposit account into which the payments should be deposited. This allows the software to have multiple users and multiple demand deposit accounts. Other options for controlling the scanning process include, the capture transaction button 704 which starts the scanning process, the report button 706 which shows a report detailing the scanning process (see FIG. 9), and the help button 708 which displays help information for the user explaining how to use the graphical user interface.

The selection box with options 712, 714, 716, and 718 inform the scanner what type of content is being scanned. Option 712 is used to scan a single check and remittance, option 714 is used to scan multiple checks and multiple remittances in a batch, option 716 is used to scan multiple checks that are not accompanied by remittances, and option 718 is used to scan multiple remittances without corresponding checks.

Output area 720 contains information about scanned payments. This includes the date of scanning 722, the time of scanning 724, the status of the scanned information 726, the transaction ID 728 of the scanning operation, and the number of items scanned in the operation 730. The status of the scanned information refers to what has been done with the scanned data. For example, pending status indicates it has been scanned, but not yet transmitted to TMS 120 for further processing.

Figure 8:
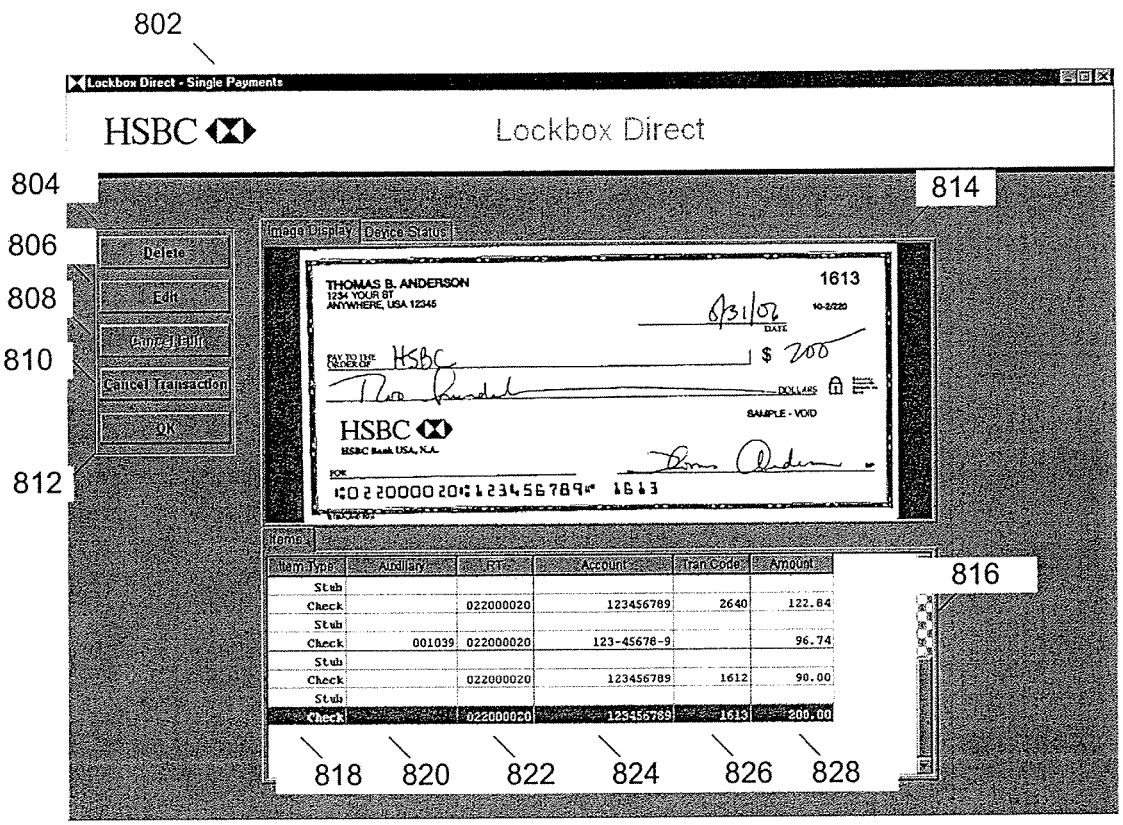
FIG. 8 is a graphical interface for reviewing captured check payments within a software application used during the remote payment capture process.

FIG. 8 is a graphical user interface for reviewing captured check payments within the software application used during the remote payment capture process. The display shows the scanned digital image 814, along with information about the scanning process 816, and buttons 804-812 for further controlling the scanning process.

The output display 814 shows the image obtained from scanning the check. The output display allows the user of the scanning system to visually confirm that it was scanned properly. Information about the scanning process 816 is shown below the scanned image and includes the type of item 818, auxiliary information 820, the routing number 822, the account number 824, the transaction code 826, and the amount of the check 828. Other fields may be included or removed as necessary for the type of payment being processed.

After reviewing the scanned image, the user can control the scanning process using the delete button 804 to delete the scanned image, the edit button 806 to make edits to the extracted information, the cancel edit button 808 to cancel any edits, the cancel transaction button 810 to end the entire scanning process, and the OK button 812 to confirm that everything is correct. By using the edit feature, a user can edit a data field or add an additional one that relates to the scanned check, or that can be applied to a batch of check or remittances that have been scanned.

Figure 9:
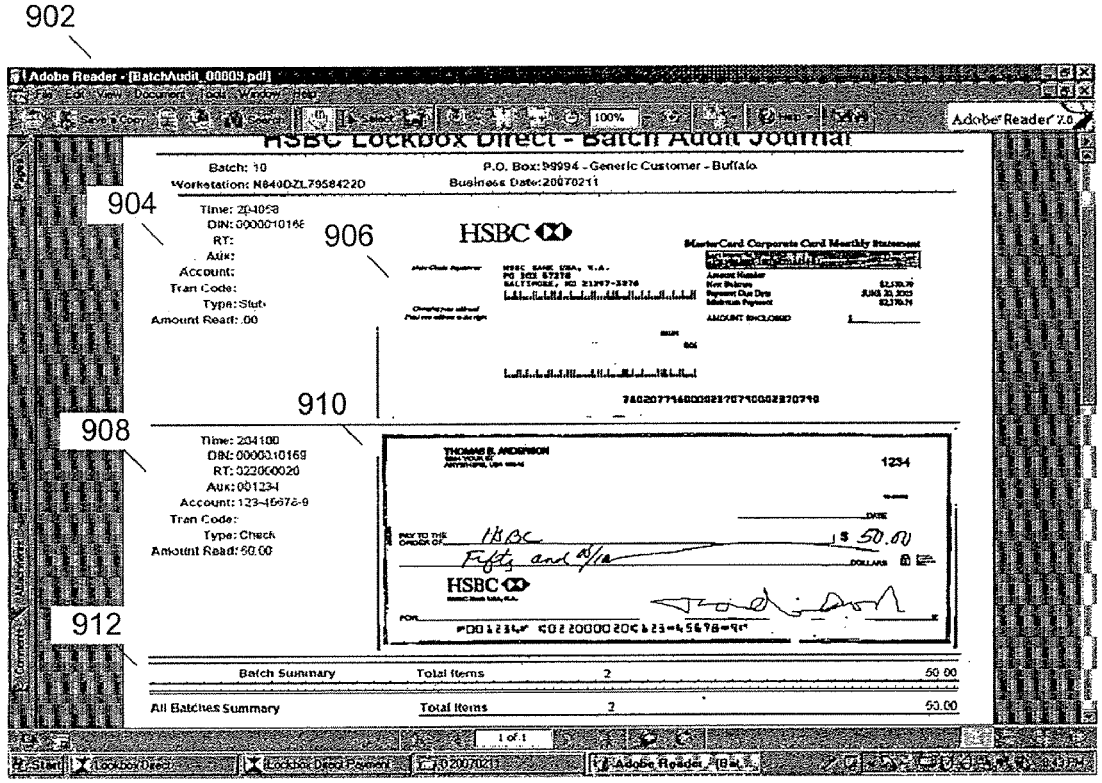
FIG. 9 is a graphical interface for viewing a report generated from capturing payments within a software application used during the remote payment capture process.

FIG. 9 is a graphical interface for viewing a report. The report is generated during the remote payment capture process. The report allows a user to easily review all the scanned images and extracted information. The report also provides an easy way to archive or print the results of the scanning process in case it needs to be reviewed at a later time.

The report 902 includes the extracted information 906 (which is the same as shown in 816), the scanned image 906 (which is the same as shown in 814), and further includes a summary 912 of all the transactions and batches that have been performed.

Figure 10:
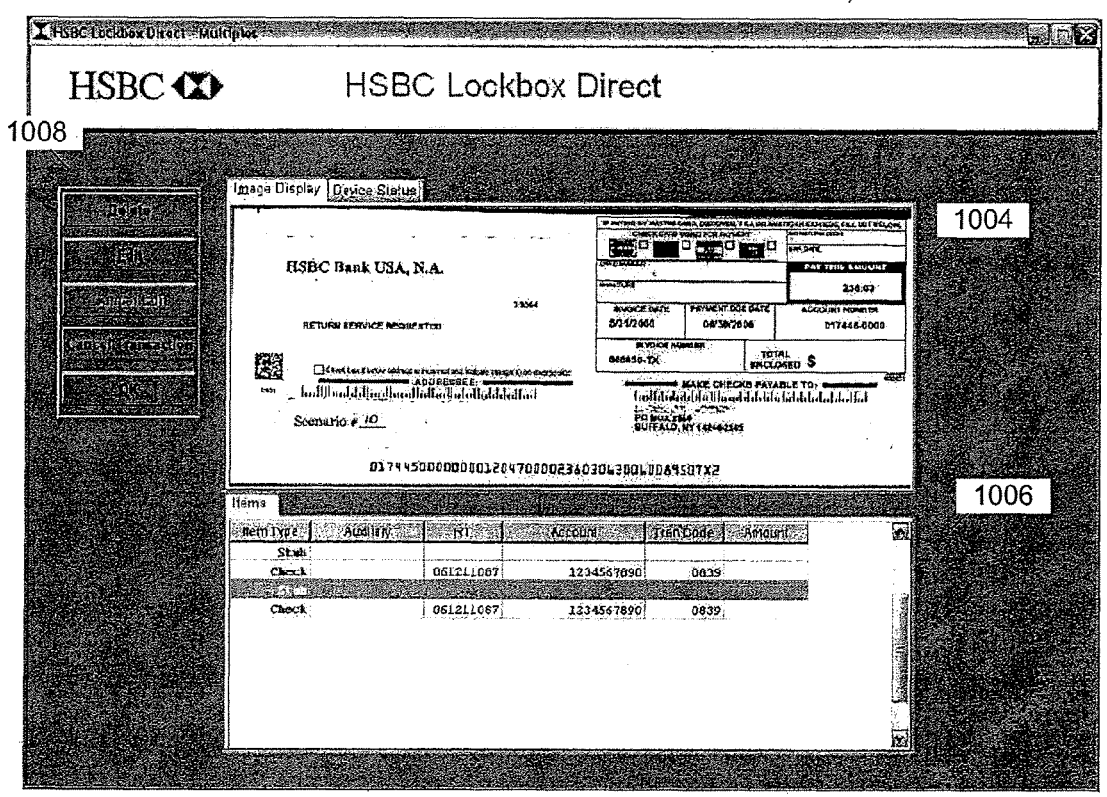
FIG. 10 is a graphical interface for reviewing captured remittance payments within a software application used during the remote payment capture process.

FIG. 10 is a graphical interface for reviewing captured remittance payments within a software application used during the remote payment capture process. This graphical interface is similar to the one shown for checks in FIG. 8 and includes an output display 1004 for showing the scanned remittances, an information area 1006 showing the extracted information, and buttons 1008 for further controlling the scanning process.

Figure 11:
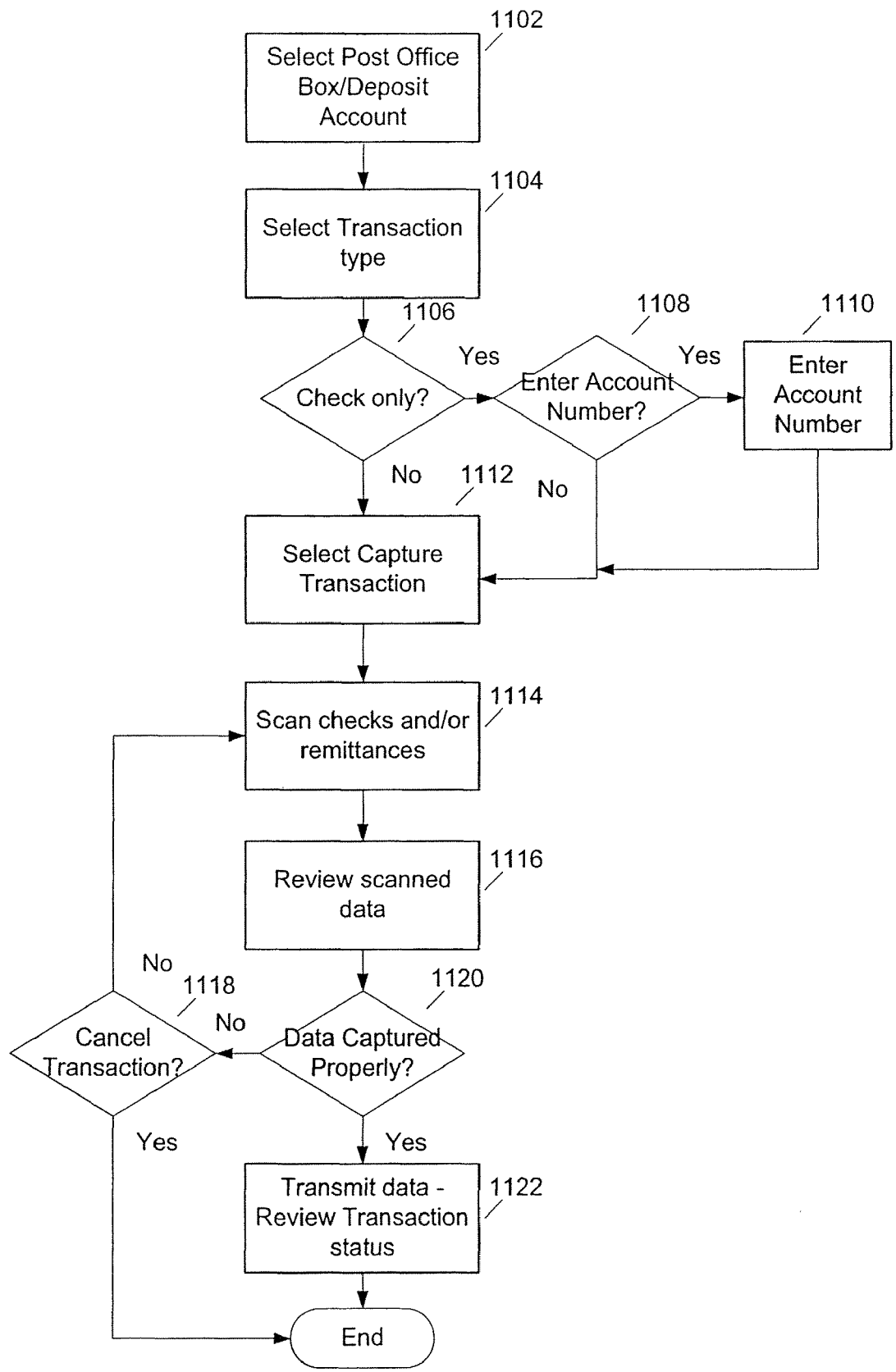
FIG. 11 is a flow diagram describing the process for capturing payments at a remote location.

FIG. 11 is a flow diagram describing the process for capturing payments at a remote location. The flow diagram describes the process for scanning payments and transmitting data.

At step 1102, the user selects the direct deposit account into which the payments will be deposited. As described above, a drop down box can be used to select one of multiple direct deposit accounts. At step 1104, the user selects the transaction type: check, remittances, a single remittance and check, or multiple remittance and checks. If scanning only a single check 1106, then the user can decide to enter an account number of the payee 1108 and 1110, which may not have been written onto the check by the payee.

At step 1112, the user selects the capture button to begin the scanning of the items identified above. At step 1114, the scanner begins scanning the checks and/or remittances. At step 1116, the user can review the scanned image and the extracted information (as shown in FIGS. 8 and 10).

At step 1120, the user determines if they are satisfied with the scanning process. At step 1122, the user can indicate they are done scanning and wish to transmit the scanned information. The information is then transmitted to the TMS system 120 for further processing. If at step 1120, the user decides they are not satisfied with the scanning process, the user can cancel the transaction at step 1118, or they can attempt to correct any problem and rescan at 1114.

For check only type work, the sort pattern business rules will be configured to ensure that the batch of scanned payments does consist only of checks. When a non check type payment is encountered during the scanning process, the user will be notified of the error, and will have the option to delete the item, or override the error. A similar process and error notice can be used in for scanning a batch of remittance payments.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. An electronic method for processing stranded payments and lockbox payments at the same designated payment location, comprising:
   (a) receiving a stranded payment at a non-designated payment location;
   (b) electronically scanning the stranded payment at the non-designated payment location, wherein scanning the stranded payment comprises:
   (i) generating a digital image of the stranded payment;
   (ii) performing optical character recognition on the digital image of the stranded payment, and recognizing data on the stranded payment by application of a predetermined template defined in accordance with the format of the stranded payment;
   (iii) validating the digital image of the stranded payment and the recognized data;
   (c) transmitting, in a secure manner, the digital image of the stranded payment and the recognized data to a designated payment location remote from the non-designated payment location;
   (d) transmitting for clearing, in the same electronic workflow, the stranded payment and a lockbox payment sent directly to the designated payment location, wherein the recognized data is used in clearing the stranded payment, and the transmitting for clearing comprises sending an electronic version to an image exchange network;
   (e) storing the recognized data, the digital image of the stranded payment, and a digital image of the lockbox payment in a database;
   (f) updating, for each stranded and lockbox payment, the accounts receivable system of the customer receiving the stranded or lockbox payment; and
   (g) transmitting a response indicating the final status of the clearing of the stranded payment to the non-designated payment location from which the digital image of the stranded payment and the recognized data were received from.

2. The method of claim 1, wherein the stranded payment is a remittance payment.

3. The method of claim 1, wherein the database is accessible by at least one of a customer service representative, a payee and a customer.

4. The method of claim 1, wherein clearing the stranded payment and the regular payment is done through an ACH network.

5. The method of claim 1, wherein electronically scanning the stranded payment is controlled by a graphical user interface.

6. The method of claim 5, wherein the graphical user interface allows manual entry to substitute for recognized data.

7. The method of claim 1, wherein the recognized data is transmitted to the designated payment location using a predefined extensible markup language definition.

8. A system for processing stranded payments and lockbox payments at the same designated payment location, comprising:
   a scanner for electronically scanning a stranded payment at a non-designated payment location, wherein scanning the stranded payment generates a digital image of the stranded payment;
   an optical character recognition component for processing the digital image of the stranded payment, and recognizing data on the stranded payment by application of a predetermined template defined in accordance with the format of the stranded payment, and for validating the digital image and the recognized data;
   a network connection for transmitting, in a secure manner, the digital image of the stranded payment and the recognized data to a designated payment location remote from the non-designated payment location;
   a payment clearing system, transmitting for clearing, in the same electronic workflow, the stranded payment and a regular lockbox payment sent directly to the designated payment location, wherein the recognized data is used in clearing the stranded payment, and the transmitting for clearing comprises sending an electronic version to an image exchange network, and wherein the payment clearing system updates, for each stranded and lockbox payment, the accounts receivable system of the customer receiving the stranded or lockbox payment, and wherein the payment clearing system transmits a response indicating the final status of the clearing of the stranded payment to the non-designated payment location from which the digital image of the stranded payment and recognized data were received from; and a database for storing the recognized data, the digital image of the stranded payment, and the lockbox payment.

9. The system of claim 8, wherein the stranded payment is a remittance payment.

10. The system of claim 8, wherein the database is accessible by at least one of a customer service representative, a payee and a customer.

11. The system of claim 8, wherein clearing the stranded payment and the lockbox payment is done through an ACH network.

12. The system of claim 8, wherein electronically scanning the stranded payment is controlled by a graphical user interface.

13. The system of claim 12, wherein the graphical user interface allows manual entry to substitute for recognized data.

14. The system of claim 8, wherein the recognized data is transmitted to the designated payment location using a predefined extensible markup language definition.

15. An electronic method for processing stranded payments and lockbox payments, comprising:
    (a) receiving a stranded payment at a non-designated payment location;
    (b) electronically scanning the stranded payment at the non-designated payment location, wherein scanning the stranded payment comprises:
        (i) generating a digital image of the stranded payment;
        (ii) performing optical character recognition on the digital image of the stranded payment, and recognizing data on the stranded payment by application of a predetermined template defined in accordance with a format of the stranded payment; and
        (iii) validating the digital image of the stranded payment and the recognized data;
    (c) receiving, in a secure manner, the digital image of the stranded payment and the recognized data by at least one computer system at the designated payment location remote from the non-designated payment location, wherein the digital image of the stranded payment is in a first predetermined file format and the recognized data is in a second predetermined file format;
    (d) processing, by the at least one computer system at the designated payment location, in a same electronic workflow, the stranded payment and the lockbox payment sent directly to the designated payment location, wherein the stranded payment and the lockbox payment have a same predetermined format, wherein the recognized data is used in processing the stranded payment, and wherein the processing comprises transmitting the stranded payment and the lockbox payment for clearing, and sending an electronic version to an image exchange network;
    (e) transmitting, by the at least one computer system at the designated payment location, the recognized data, the digital image of the stranded payment, and a digital image of the lockbox payment for storing in a database;
    (f) transmitting, by the at least one computer system at the designated payment location, an update, for each stranded or lockbox payment, to an accounts receivable system of a customer receiving the stranded or lockbox payment; and
    (g) transmitting, by the at least one computer system at the designated payment location, a response indicating a final status of the clearing of the stranded payment, to the non-designated payment location from which the digital image of the stranded payment and the recognized data were received.

16. The method of claim 15, wherein the stranded payment is a remittance payment.

17. The method of claim 15, wherein the database is accessible by at least one of a customer service representative, a payee, and a customer.

18. The method of claim 15, wherein the transmitting for clearing further comprises transmitting the stranded payment and the lockbox payment for clearing using an ACH system.

19. The method of claim 15, wherein the electronically scanning the stranded payment is controlled by a graphical user interface.

20. The method of claim 19, wherein the graphical user interface allows manual entry to edit or add additional data to the recognized data.

21. The method of claim 15, wherein the recognized data is received by the designated payment location in a predefined extensible markup language.

22. An electronic method for processing stranded payments and lockbox payments, comprising:
    (a) receiving at least one stranded payment at a non-designated payment location;
    (b) electronically scanning the stranded payment at the non-designated payment location, wherein scanning the stranded payment comprises:
        (i) generating a digital image of the stranded payment;
        (ii) performing optical character recognition on the digital image of the stranded payment, and recognizing data on the stranded payment by application of a predetermined template defined in accordance with a format of the stranded payment; and
        (iii) validating the digital image of the stranded payment and the recognized data;
    (c) transmitting, in a secure manner, the digital image of the stranded payment and the recognized data to a designated payment location remote from the non-designated payment location, wherein the digital image of the stranded payment is in a first predetermined file format and the recognized data is in a second predetermined file format, so that the stranded payment can be combined with at least one lockbox payment received by the designated payment location and the stranded payment and the lockbox payment can be processed by at least one computer system at the designated payment location in a same electronic workflow, wherein said workflow comprises:
        (i) transmitting to a predetermined entity, over an electronic network corresponding to the predetermined entity, for each stranded or lockbox payment, an electronic file for clearing the stranded or lockbox payment, wherein the recognized data is used in clearing the stranded payment;
        (ii) transmitting the recognized data, the digital image of the stranded payment, and a digital image of the lockbox payment for storing in a database; and
        (iii) transmitting, for each stranded or lockbox payment, an update to an accounts receivable system of a customer receiving the stranded or lockbox payment; and (d) receiving at the non-designated payment location a response from the at least one computer system at the designated location indicating a final clearing status of the stranded payment.

23. The method of claim 22, wherein the stranded payment is a remittance payment.

24. The method of claim 22, wherein the database is accessible by at least one of a customer service representative, a payee, and a customer.

25. The method of claim 22, wherein the transmitting for clearing further comprises transmitting the stranded payment and the lockbox payment for clearing using an ACH system.

26. The method of claim 22, wherein the electronically scanning the stranded payment is controlled by a graphical user interface.

27. The method of claim 26, wherein the graphical user interface allows manual entry to edit or add additional data to the recognized data.

28. The method of claim 22, wherein the recognized data is received by the designated payment location in a predefined extensible markup language.

* * * * *